United States Patent [19]

Lestenkof, Jr.

[11] Patent Number: 5,102,073
[45] Date of Patent: Apr. 7, 1992

[54] FREESTANDING CONCRETE PIPE SUPPORT

[75] Inventor: Michael Lestenkof, Jr., Anchorage, Ak.

[73] Assignee: Atlantic Richfield Company, Los Angeles, Calif.

[21] Appl. No.: 944,142

[22] Filed: Dec. 18, 1986

[51] Int. Cl.[5] ............................................. F16L 3/00
[52] U.S. Cl. ...................................... 248/49; 138/106; 248/55
[58] Field of Search .................. 248/49, 55, 76, 80; 138/106; 405/157, 131

[56] References Cited

U.S. PATENT DOCUMENTS 3,722,845 3/1973 Unger ............................ 248/679 X Primary Examiner—David L. Talbott
Attorney, Agent, or Firm—Robert D. Lott

[57] ABSTRACT

A moveable, freestanding concrete pipe support suitable for use in arctic climates includes a concrete base which rests on a flat surface of the terrain. A metallic pipe support attached to the top of the base provides an interface between the concrete base and the pipe itself.

9 Claims, 3 Drawing Sheets

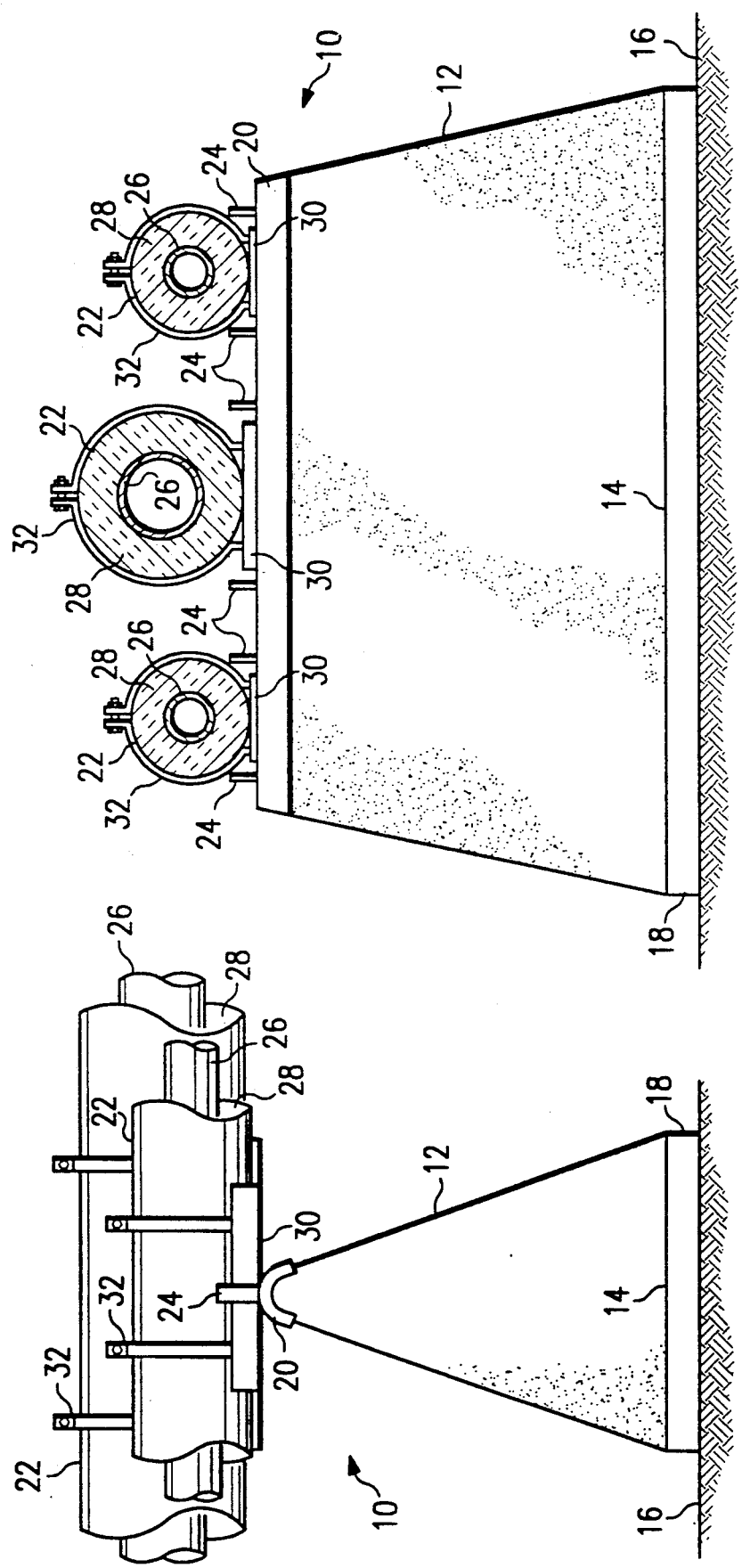

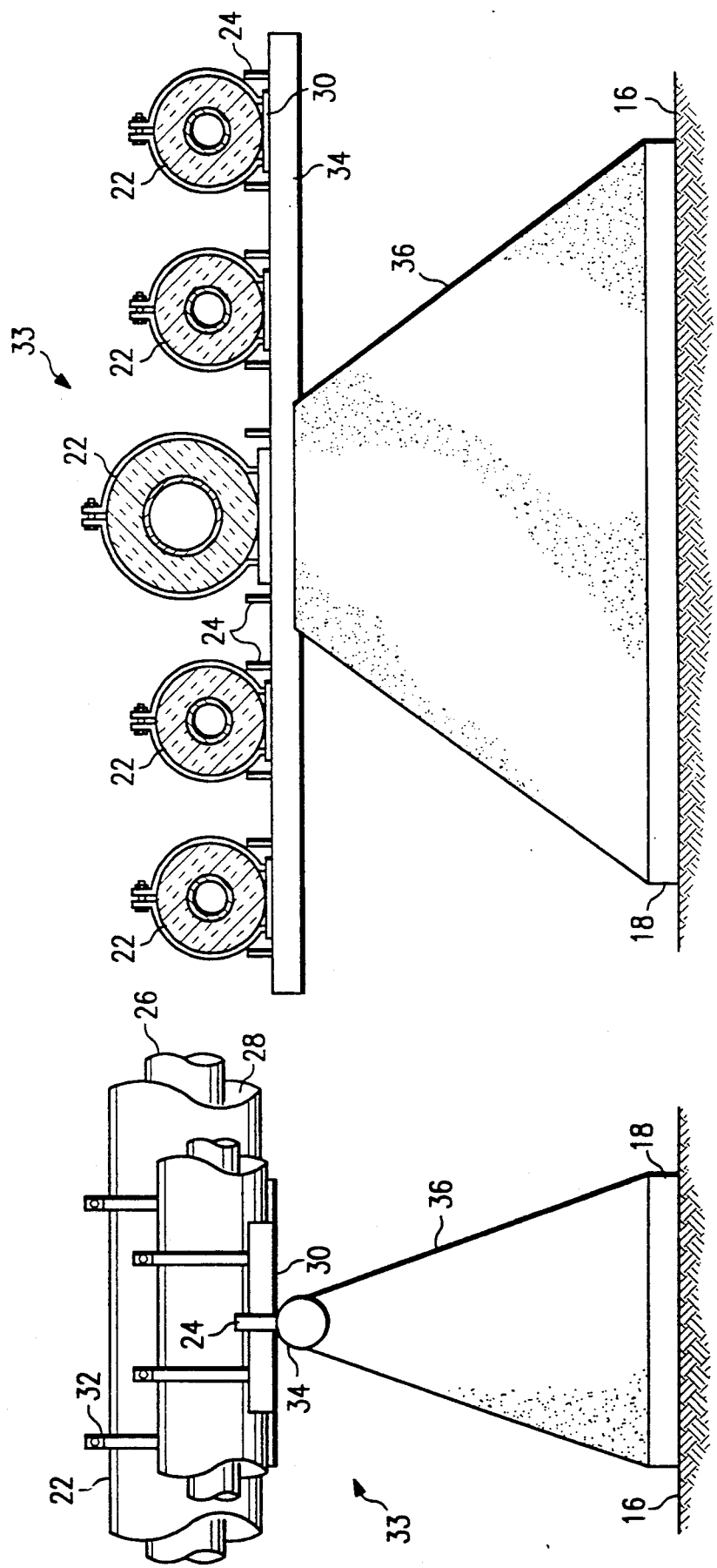

FREESTANDING CONCRETE PIPE SUPPORT

BACKGROUND OF THE INVENTION

1. Field of the Invention

This invention relates generally to pipe supports and more particularly to moveable, freestanding pipe supports suitable for use in arctic climates.

2. Description of the Prior Art

Pipelines used in arctic climates, especially those designed to carry crude oil in large volumes, are expensive to build and represent a potential hazard to the environment since ruptures of such pipelines can cause crude oil to be spilled onto the ground in large volumes which may cause an environmental impact to the area. It is, therefore, important that such pipelines be well supported. While in the past, some of such pipelines have been supported only on wooden cribs or sleepers or on oil drums or even laid directly on the ground, the presently preferred and approved pipeline supports are VSM supports.

VSM supports are anchored in the ground by first drilling a hole in the ground and then slurrying in a support pipe which extends above the ground and supports horizontal cross members which in turn support the pipe line or pipe lines.

However, certain problems are inherent with VSM supports. The tight design tolerances combined with the requirement that the contactor have access to appropriate drilling equipment and slurry plants makes the VSM supports relatively expensive to put in place. Moreover, the VSM supports are not portable and, while the supports are built with disconnect couplings close to the ground, in the winter when the ground is frozen and layers of ice are built up on the ground, it is common practice to simply cut off the supports with a welding torch and then to later reweld the joint with a relatively difficult field weld.

Other pipe supports have been used in the arctic which use a unistrut structure and a pair of fiberglass pads for supporting pipes generally smaller than oil pipelines. However, such supports are not considered stable enough for oil pipelines.

It can, therefore, be appreciated that a pipe support which is freestanding, relatively moveable and inexpensive to fabricate, yet provides a stable platform for a pipeline is highly desirable.

SUMMARY OF THE INVENTION

It is, therefore, an object of the this invention to provide a pipe support for a pipeline in arctic climates which is freestanding, relatively inexpensive to fabricate, and provides adequate support for a pipeline.

As shown in an illustrated embodiment of the invention, a moveable, freestanding pipe support suitable for use in arctic regions has a concrete base with a flat bottom surface such that the base will be stable on a generally flat surface. Secured to the top of the base is a metallic support for the pipe which includes metallic members to prevent excessive lateral movement of the pipe.

BRIEF DESCRIPTION OF THE DRAWINGS

The aforementioned and other features, characteristics, advantages, and the invention in general, will be better understood from the following more detailed description taken in conjunction with the accompanying drawings in which:

FIG. 1 is a side view (FIG. 1A) and an end view (FIG. 1B) of a first embodiment of a pipe support in accordance with this invention;

FIG. 2 is a side view (FIG. 2A) and an end view (FIG. 2B) of a second embodiment of a pipe support in accordance with this invention.

Figure 3A:
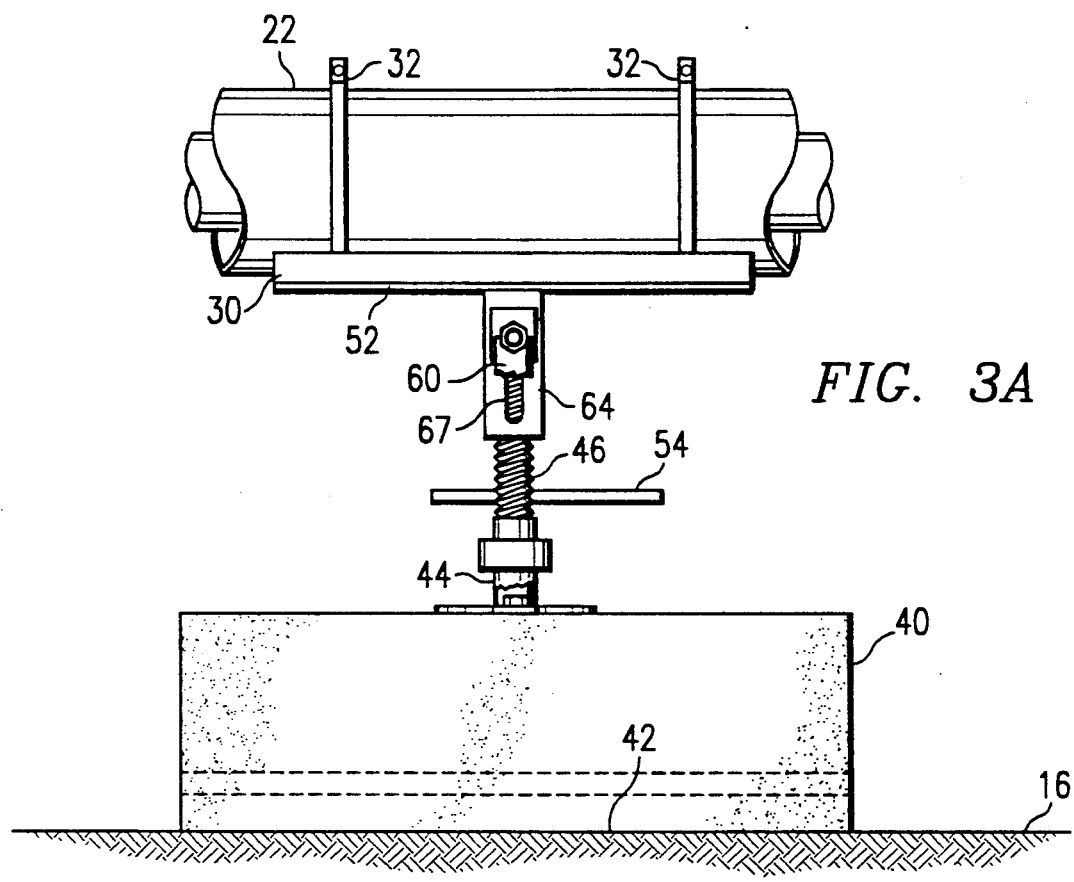
FIG. 3 is a side view (FIG. 3A) and an end view (FIG. 3B) of a third embodiment of a pipe support in accordance with this invention.

It will be appreciated that for simplicity and clarity of explanation, the drawings have not necessarily been drawn to scale and reference numerals have been repeated as considered appropriate in the drawings to indicate corresponding features.

DESCRIPTION OF THE PREFERRED EMBODIMENT

Turning now to the drawings, FIG. 1A is a side view of a freestanding pipe support 10 according to the present invention. The pipe support 10 includes a concrete base 12 which is generally triangular shape in the side elevation shown in FIG. 1A and generally trapezoidal shape in the end view elevation shown in FIG. 1B. The concrete base 12 has a flat bottom surface 14 which is designed to set on a generally flat surface 16 of the terrain. Also shown in FIG. 1 is an insulator 18 which is positioned between the base 12 and the surface 16 of the terrain. Attached to the top, or apex, of the base 12 is a rounded metallic plate 20 which provides the contact surface to one or more pipelines 22. Attached to the metal plate 20 are a series of vertical metal pins or saddle guides 24. The saddle guides is not attached to the pipe 22 but rather prevent lateral movement of the pipeline 22.

Arctic oilfield pipelines 22 which may be used with the present invention are generally insulated involving an internal pipe 26 surrounded by an insulating layer 28. In the preferred embodiment, the pipeline 22 does not rest directly on the round metallic plate 20, but rather is supported by pipe support saddle 30 which rests on the rounded metallic plate 20 and is secured to the pipeline 22 with strap members 32. The pipe support saddle 30 is designed to conform to the shape of the pipe to support the pipe and to provide sufficient surface contact area with the insulation 28 to prevent crimping or distortion of the insulation 28.

Advantageously, the pipe 22 and the pipe support saddle 30 rests on the rounded metallic plate 20, but is not attached to the rounded metallic plate 20 thereby permitting axial movement of the pipeline 22 on the pipe support 10 due to expansion and contraction of the pipeline 22. Moreover, the bottom surface 14 of the base 12 does not have to be parallel with the longitudinal axis of the pipeline 22 at the point of support, but rather the longitudinal axis of the pipeline 22 may lie at an angle with respect to the bottom surface 14 of the base 12. Thus, the pipe support 10 is suitable for supporting pipelines which are not level, but rather are rising at a vertical angle with respect to the bottom surface 14 of the base 12.

In insulator 18 may, or may not, be used depending on the amount of heat transferred from the pipeline 22 through the concrete base 12 to the bottom surface 14 of the concrete base 12. In arctic regions it is advantageous to keep heat from the surface 16 the terrain in order to prevent melting of the permanent thermal frost. Thus, if necessary, the insulator 18 may be used to further insulate the pipeline 22 from the surface of the terrain 16.

An alternative embodiment of the pipe support 10 of FIG. 1 is the pipe support 33 shown in FIG. 2 in which the rounded metallic plate 20 of FIG. 1 has been replaced with a pipe crossbeam 34 which extends beyond the width of the concrete base 36 of FIG. 2 to provide a longer support base for holding more pipelines 22 than the embodiment shown in FIG. 1. The embodiment of FIG. 1 is designed to preferably support up to three pipelines 22, whereas the pipe support of FIG. 2 with the cantilevered pipe 34 as a crossbeam is designed to support more than three pipelines 22 while still providing a base 36 of suitable mass to support the pipelines 22.

In the embodiment shown in FIG. 1 and FIG. 2, the height of the base 12 and 36 in the preferred embodiment is approximately five foot high in order to permit caribou movement below the pipelines 22.

Figure 3B:
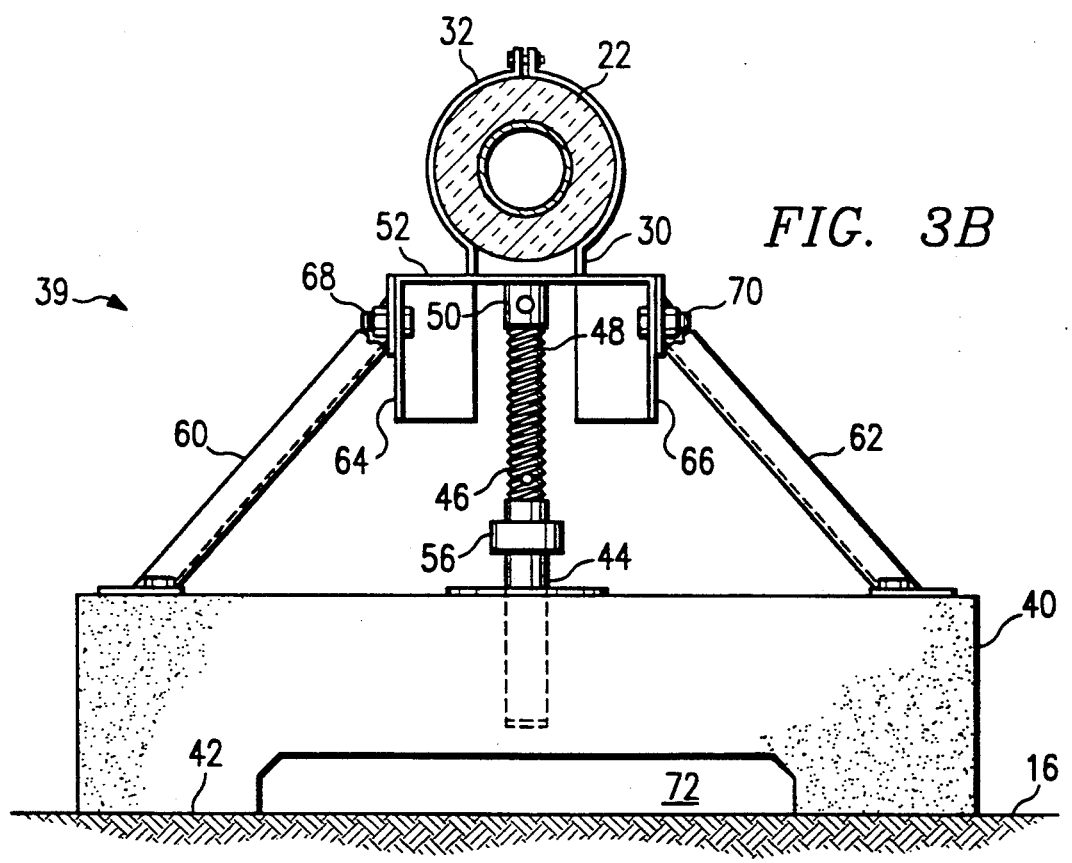

Turning now to FIG. 3, a third embodiment of the pipe support according to the present invention includes a rectangular base support 40 having a generally flat bottom surface 42 for resting on the surface 16 of the terrain. Embedded in the center of the base 40 is a stationary portion 44 of a vertical jack screw 46. A threaded portion 48 of the jack screw 46 is threaded into the stationary portion of a jack screw 44 and rotates freely in an upper collar 50 which in turn is welded to the bottom plate 52 of the pipe support saddle 30. Extending through the threaded portion 48 of the jack screw 46 is a handle 54 which is turned to rotate the threaded portion 48 of the jack screw 48 to thereby raise or lower the threaded portion 48 and the upper collar 50. A lower collar 56 attached to the bottom support 44 of the jack screw 46 surrounds the threaded part 48.

Also attached to the base 40 are two angle iron support brackets 60 and 62 which are bolted to the concrete base 40 and also bolted to two corresponding vertical slotted members 64 and 66 respectively. The vertical slotted member 64 and 66 are angle iron members which are welded to the base 52 of the pipe support saddle 30. The slotted member 64 and 66 have vertical slots 67 for receiving bolts 68 and 70 respectively, which attach to the angle iron support member 60 and 62 respectively. In this manner the base plate 52, together with the pipe support saddle 30 and the pipeline 22 can be raised or lowered using the jack screw 46, and after the height adjustment has been made, the bolts 67 and 70 can be secured thereby securing the base plate 52 to the side supports 60 and 62.

Advantageously, a channel 72 is formed in the bottom portion of the base 40 and extends from one side to the other side of the base 40. Using this channel region, equipment such as a forklift can easily raise the pipe support 39 and move it from one location to the other. Thus, the pipe support is easily moveable and easily positionable in place. This channel 72 can also be formed in the pipe supports 10 and 33 of FIG. 1 and FIG. 2 respectively. The height of the base 40 in the preferred embodiment is slightly over one foot high and the centerline of the pipe 22 can be raised or lowered within a range of approximately three to four feet.

It will also be appreciated that the jack screw 46 and support member 60 and 62 allow some axial movement of the pipeline 22 caused by expansion and contraction of the pipeline without shearing or damaging the jack screw 46 or the support member 60 and 62.

While not shown in FIG. 3, it is also possible to insulate the concrete base 40 from the surface 16 of the terrain with an insulator similar to insulator 18 of FIGS. 1 and 2.

The above-described embodiments of concrete pipeline supports provide a concrete base to provide a secure support for the pipeline 22 and yet provide a support which is moveable and which is relatively inexpensive to manufacture.

Although the invention has been described in part by taking detailed reference to specific embodiments, such details was intended to be and will be understood to be instructive rather than restrictive. It will be appreciated by those in the art that many variations may be made in the structure without departing from the spirit and scope of the invention as disclosed in the teachings contained herein. For example, the rounded metallic plate 20 shown in FIG. 1 could be replaced with a pipe embedded in the concrete base in the manner shown in FIG. 2.

What is claimed is:

1. A moveable, freestanding pipe support suitable for use in arctic climates comprising:
   a. a concrete base having a flat bottom area such that said base will be stable on a generally flat surface;
   b. a metallic support secured to said base for providing a metallic rest for said pipe and for preventing excessive lateral movement of said pipe; and
   c. an insulator attached to the bottom of said concrete base to provide thermal insulation between said concrete base and said generally flat surface.

2. The moveable, freestanding pipe support as set forth in claim 1 further including a pipe support saddle attached to said pipe and resting on said metallic support.

3. A moveable, freestanding pipe support suitable for use in arctic climates comprising:
   a. a concrete base having a flat bottom area such that said base will be stable on a generally flat surface;
   b. a metallic support secured to said base for providing a metallic rest for said pipe and for preventing excessive lateral movement of said pipe, and
   c. wherein said concrete base includes an opening suitable for lifting said pipe support to facilitate movement of said pipe support.

4. The moveable, freestanding pipe support as set forth in claim 3 further including a pipe support saddle attached to said pipe and resting on said metallic support.

5. A moveable, freestanding pipe support suitable for use in arctic climates comprising:
   a. a concrete base having a flat bottom area such that said base will be stable on a generally flat surface;
   p1 b. a metallic support secured to said base for providing a metallic rest for said pipe and for preventing excessive lateral movement of said pipe, and
   c. wherein said metallic support further includes a height adjustment for adjusting the height of said pipe above said flat surface.

6. The moveable, freestanding pipe support as set forth in claim 5 further including a pipe support saddle attached to said pipe and resting on said metallic support.

7. A moveable, freestanding pipe support suitable for use in arctic climates comprising:
   a. a concrete base having a flat bottom area such that said base will be stable while resting on a generally flat surface, said base further including means for lifting said pipe support to facilitate movement of said pipe support; and b. a metallic support secured to said base for providing a metallic rest for said pipe and for preventing excessive lateral movement of said pipe, said metallic support being tolerant of limited axial movement of said pipe, and being able to support said pipe when the long axis of said pipe at the point of support is inclined at an angle with respect to said generally flat surface, said metallic support further including a height adjustment for adjusting the height of said pipe above said flat surface.

8. The movable, freestanding pipe support as set forth in claim 7 further including an insulator attached to the bottom of said concrete base to provide thermal insulation between said concrete base and said generally flat surface.

9. The moveable, freestanding pipe support as set forth in claim 7 further including a pipe support saddle attached to said pipe and resting on said metallic support.

* * * * *